(12) United States Patent
Beckman et al.

(10) Patent No.: US 7,345,781 B2
(45) Date of Patent: Mar. 18, 2008

(54) TIME ESTIMATOR FOR PRINTING WORKFLOW

(75) Inventors: Orhan E. Beckman, Camas, WA (US); Jennifer L. Farrell, Vancouver, WA (US); Robert D. Walton, Culver City, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 888 days.

(21) Appl. No.: 10/400,785

(22) Filed: Mar. 27, 2003

(65) Prior Publication Data

US 2004/0190043 A1    Sep. 30, 2004

(51) Int. Cl.
*G06F 15/00* (2006.01)
(52) U.S. Cl. .................. 358/1.15; 358/1.13; 358/1.16; 702/176; 708/173
(58) Field of Classification Search ............... 358/1.15; 702/176; 708/173
See application file for complete search history.

(56) References Cited

U.S. PATENT DOCUMENTS

| | | | |
|---|---|---|---|
| 5,963,641 A | | 10/1999 | Crandall et al. |
| 6,256,108 B1 | | 7/2001 | Dziesietnik et al. |
| 6,411,314 B1 | | 6/2002 | Hansen et al. |
| 6,608,697 B1 | * | 8/2003 | Schorr et al. ............... 358/1.15 |
| 6,977,734 B2 | * | 12/2005 | Shima ........................ 358/1.12 |
| 7,051,328 B2 | * | 5/2006 | Rai et al. .................... 718/102 |
| 7,161,696 B2 | * | 1/2007 | Yamamoto et al. ......... 358/1.15 |
| 2004/0085558 A1 | * | 5/2004 | Minns et al. ............... 358/1.11 |
| 2004/0125385 A1 | * | 7/2004 | Mellor et al. ................ 358/1.1 |
| 2004/0145772 A1 | * | 7/2004 | Stringham .................. 358/1.15 |

FOREIGN PATENT DOCUMENTS

| | | |
|---|---|---|
| WO | WO 01/93041 | 12/2001 |
| WO | WO 02/08861 | 1/2002 |

OTHER PUBLICATIONS

European Search Report for Application No. EP03022915.7. Report issued Feb. 23, 2007.

* cited by examiner

*Primary Examiner*—Twyler Lamb
*Assistant Examiner*—Mark R. Milia (57) ABSTRACT

A preflight time estimator for a printing workflow is provided. An estimated preflight time is determined by analyzing a plurality of previously measured preflight times. The analysis may include tracking and analyzing at least one preflight attribute of a plurality of print jobs. The preflight time estimator may comprise a computer readable media including computer executable instructions for calculating the estimated preflight time. A printer configured to execute the instructions of the computer readable media is also provided.

28 Claims, 5 Drawing Sheets

TIME ESTIMATOR FOR PRINTING WORKFLOW

BACKGROUND OF THE INVENTION

1. Field of the Invention

The present invention relates generally to the field of printing systems and services. More specifically, the present invention relates to estimating the time required to perform a preflight process in a printing workflow.

2. State of the Art

Figure 1:
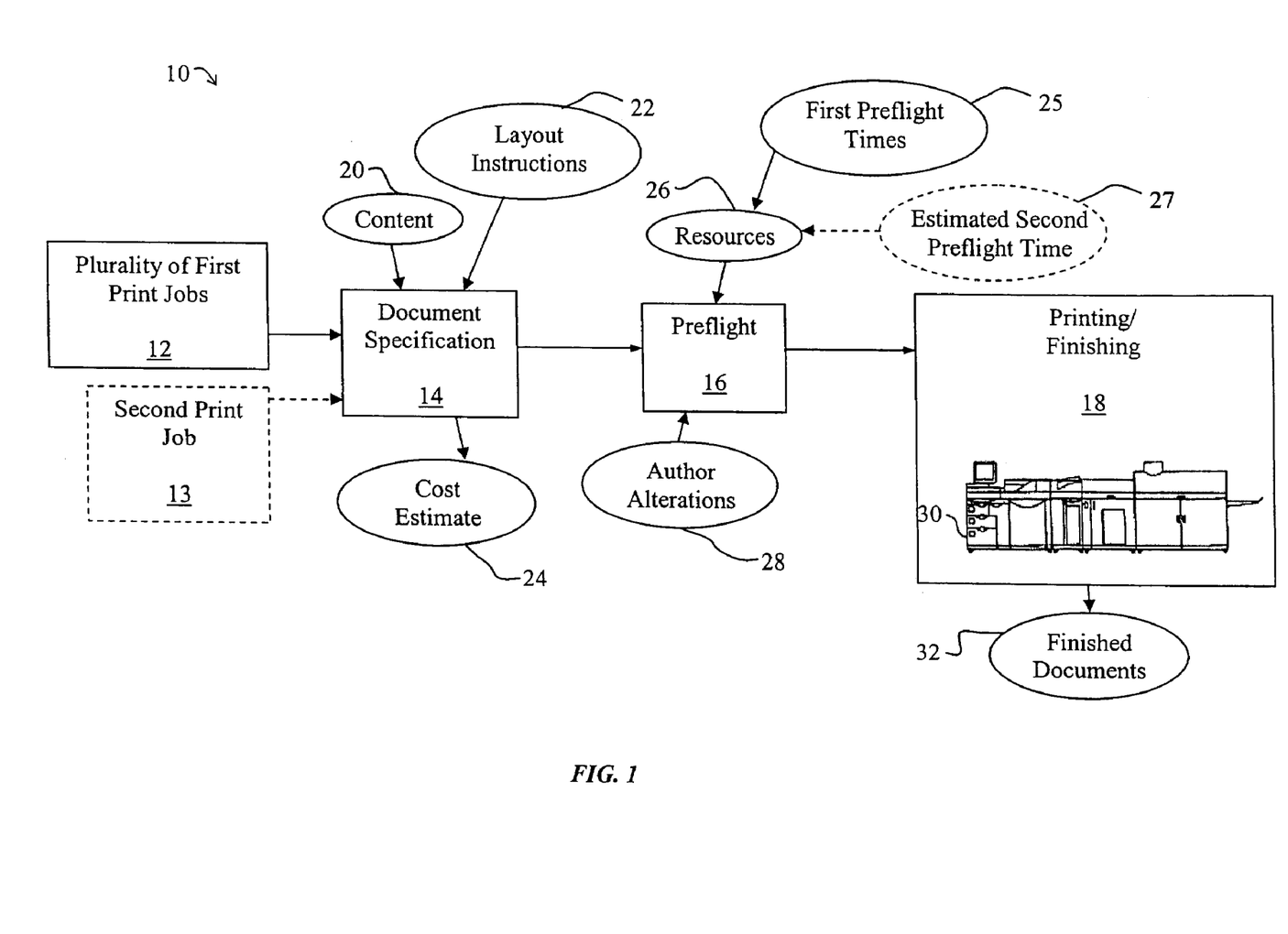
FIG. 1 is a diagram illustrating a printing workflow.

Commercial printing typically includes high volume or specialized production of finished documents in a manual or electronic print shop. The printing process timeline typically includes a setup or compilation time period which is known in the art as "preflight" time. FIG. 1 illustrates a basic printing workflow 10 for a plurality of first print jobs 12 and a new or second print job 13 as employed, at least in part, in a typical print shop. The second print job 13 and its corresponding estimated second preflight time 27 are shown with dashed lines to distinguish them in time from the plurality of first print jobs and their corresponding measured first preflight times 25. As used herein, "workflow" includes the tasks, steps, procedures, information, tools and other resources needed to carry out a business process. Each of the plurality of first print jobs 12 and the second print job 13 comprise a plan or request (e.g., from a customer) to produce one or more finished documents 32. The printing workflow 10 includes document specification 14, preflight 16 and printing/finishing 18. Alternatively, one or more workflow 10 processes may be combined and additional processes may be added to produce the finished documents 32.

Document specification 14 typically includes identifying the desired content 20 (e.g., text, graphics, images, etc.) and organizing the content 20 or providing instructions 22 for how the content 20 is to be organized in the finished documents 32. The content 20 may be in hardcopy form, electronic form, or a combination of hardcopy and electronic documents that are to be combined in the final reproductions. For example, the content may include images in the form of processed photographs that are to be inserted into an electronic copy of a text document. With advances in desktop publishing technology, much of the content 20, as well as organization and individual page layout may be performed outside of the print shop. However, the content 20, organization and page layout produced by the desktop publishing technology and provided to the print shop may contain errors or be incompatible with the printing technology of the print shop. Further, for more complicated layouts and tasks, it may be necessary to provide layout instructions 22 to the print shop. Layout instructions 22 may include, by way of example, specifying the types and sizes of fonts for different parts of text, colors to be used in graphics, weight and size of media, page numbering or other annotations, general organization such as ordering individual text documents into chapters, and locations of graphics and images. The layout instructions 22 may specify finishing information such as the type of binding, cover specifications, number of folds, and protective coatings.

The layout instructions 22 may also include personalized printing instructions wherein each copy of the finished documents 32 is customized for its intended recipient. For example, a personalized printing campaign may include information unique to the intended recipient such as name, address, company logo or other graphical or copy elements tailored to the recipient. Thus, each copy may comprise static data that are the same in each finished document and variable data that are unique to the particular copy or subset of copies. Personalized printing instructions may also include static page layouts as well as variable page layouts that are customized for each intended recipient or group of recipients. Variable data may be selected from one or more electronic databases containing a plurality of records, each record comprising a plurality of data fields. The personalized printing instructions may include one or more rules that define database queries and specify the variable data to be used for each copy of the personalized printing campaign.

During document specification 14, a customer requesting a print job 12, 13 may indicate the number of finished documents 32 to be produced during printing/finishing 18. Printing/finishing 18 typically includes the processes necessary to produce the finished documents 32 once a final proof created during preflight 16 has been approved. The finished documents 32 may be created using output devices 30 such as a printing press, a high volume digital printer, a binding machine or any other imaging or finishing device known in the art. The finished documents 32 may include, by way of example, individually printed sheets, bound books, tabbed notebooks, folded brochures, color flyers or coated posters.

Upon receiving the print job 12, 13 request from a customer during document specification 14, the print shop may provide the customer with a cost estimate 24. The accuracy of the cost estimate 24 may largely depend upon the print shop's ability to predict the cost of preflight 16. Preflight 16 typically involves checking a document for errors and then preparing it for printing on a specific output device 30. The resources 26, including time, which the print shop requires to prepare the document for printing may depend upon the content 20 and layout instructions 22 provided by the customer to the print shop during document specification 14. For example, a customer may provide the print shop with a "print ready" file comprising content 20 in a form that may be sent directly to an output device 30, such as a digital printer. Thus, the print shop may expend only a short amount of time to check the file for errors during preflight 16 before passing it to the digital output device 30 for printing/finishing 18.

By contrast, a print shop may be required to expend substantial resources 26 to prepare a document for printing on a specific output device 30. For example, the content 20 provided by a customer may need to be combined and organized into page layouts. Source documents in hardcopy form may need to be scanned to create electronic documents while source documents in electronic form may need to be converted to another electronic file format in order to be edited or to be processed by the output device 30. During preflight 16, errors such as unwanted text or marks may need to be removed; pages may need to be added, shuffled or reversed; annotations such as headers, footers or page numbers may need to be added; graphics, images and fonts may need to be resized; margins may need to be adjusted to allow for bindings; colors may need to be added, changed or removed; and databases may need to be configured to define the number of records, the number of fields to be used per record, and query rules.

Print shops generally prefer to minimize the preflight time 25, 27, effort, and other resources 26 consumed during the preflight 16 of a print workflow process because preflight 16 is typically a cost center rather than a profit center. In other words, much of the actual costs of preparing documents during preflight 16 are not passed on to the print shop's customers directly. Part of the problem of passing preflight 16 costs to the customer is the difficulty of estimating the second preflight time 27 required to be added to preflight 16 for a new or second print job 13 as compared to the measured first preflight times 25 of a plurality of first print jobs 12. The amount of time 27, effort, and other resources 26 spent during preflight 16 of the plurality of first print jobs 12 may vary greatly.

Preflight 16 costs for the plurality of first print jobs 12 may also depend on the customer's sophistication and skills in designing and preparing the documents for print. For example, it is estimated that approximately 80% of a print shop's customers may provide a portion of the plurality of first print jobs 12 that require very little time 25 for preflight 16 while approximately 20% of its customers may provide a portion of the plurality of first print jobs 12 that require substantial amounts of time 25 to prepare. Due to the difficulty in estimating preflight times 25, the print shop may be required to either indiscriminately pass the costs generated by the 20% of its customers on to the other 80% or consistently exceed estimates by seeking billing approval from those customers (e.g., the 20%) whose portion of the plurality of first print jobs 12 require changes. Changes to text and layout while a document is in the preflight 16 stage is typically referred to as "author alterations" 28 and may cause delays in preflight 16. Author alterations may result from customer error and may require the customer to expend its own resources to correct the error. Further, it may be customary to make needed author alterations at the print shop without prior notification to the customer, which may cause surprise when the final billing statement is received.

In view of the shortcomings in the art, it would be advantageous to provide a method for estimating a second preflight time 27 corresponding to a new or second print job 13. An improved estimated second preflight time 27 would allow a print shop to better schedule its resources 26 and to provide its customers with more accurate cost estimates 24. An improved estimated second preflight time 27 may also allow a print shop to reward those customers which provide content 20 to the print shop in a form requiring little or no resources 26 to be spent during preflight 16. Further, the estimated second preflight time 27 may be shared with the print shop's customer as to help the customer streamline their own workflows and procedures.

BRIEF SUMMARY OF THE INVENTION

A preflight time estimator for a printing workflow is provided. In one embodiment of the present invention, a method is provided for estimating a preflight time for a new print job based upon measured preflight times for a plurality of previous print jobs. In another embodiment of the present invention, at least one preflight attribute of each of the plurality of previous print jobs is tracked and analyzed.

In another embodiment of the present invention, a printer configured to estimate the preflight time of a printing workflow is provided. In yet another embodiment of the present invention, a computer readable medium including computer executable instructions for performing an estimation of a preflight time for a printing workflow is provided.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

As discussed above, FIG. 1 shows a diagram of a printing workflow 10 configured to produce finished documents 32 for each of a plurality of first print jobs 12 and a new or second print job 13. According to an embodiment of the present invention, the resources 26 required during preflight 16 for the second print job 13 may be estimated by analyzing the preflight 16 operations performed on at least a portion of the plurality of first print jobs 12.

Each of the plurality of first print job 12 and the second print job 13 may comprise at least one preflight attribute that affects the amount of resources 26 required to be used during preflight 16. By way of example, and not by limitation, a preflight attribute may comprise the identity ("ID") of the customer requesting the particular print job 12, 13, the size of the file to be printed, the number of static images, the number of fonts, the number of pages, or the number of colors. Also by way of example, and not by limitation, if the particular print job 12, 13 is a personalized printing campaign, a preflight attribute may comprise the number of variable images, the number of variable text boxes, the number of databases to query, the number of records in each database, the number of fields in each database, or the number of rules defining which variable image or variable text to use for a particular copy of the personalized printing campaign.

Figure 2:
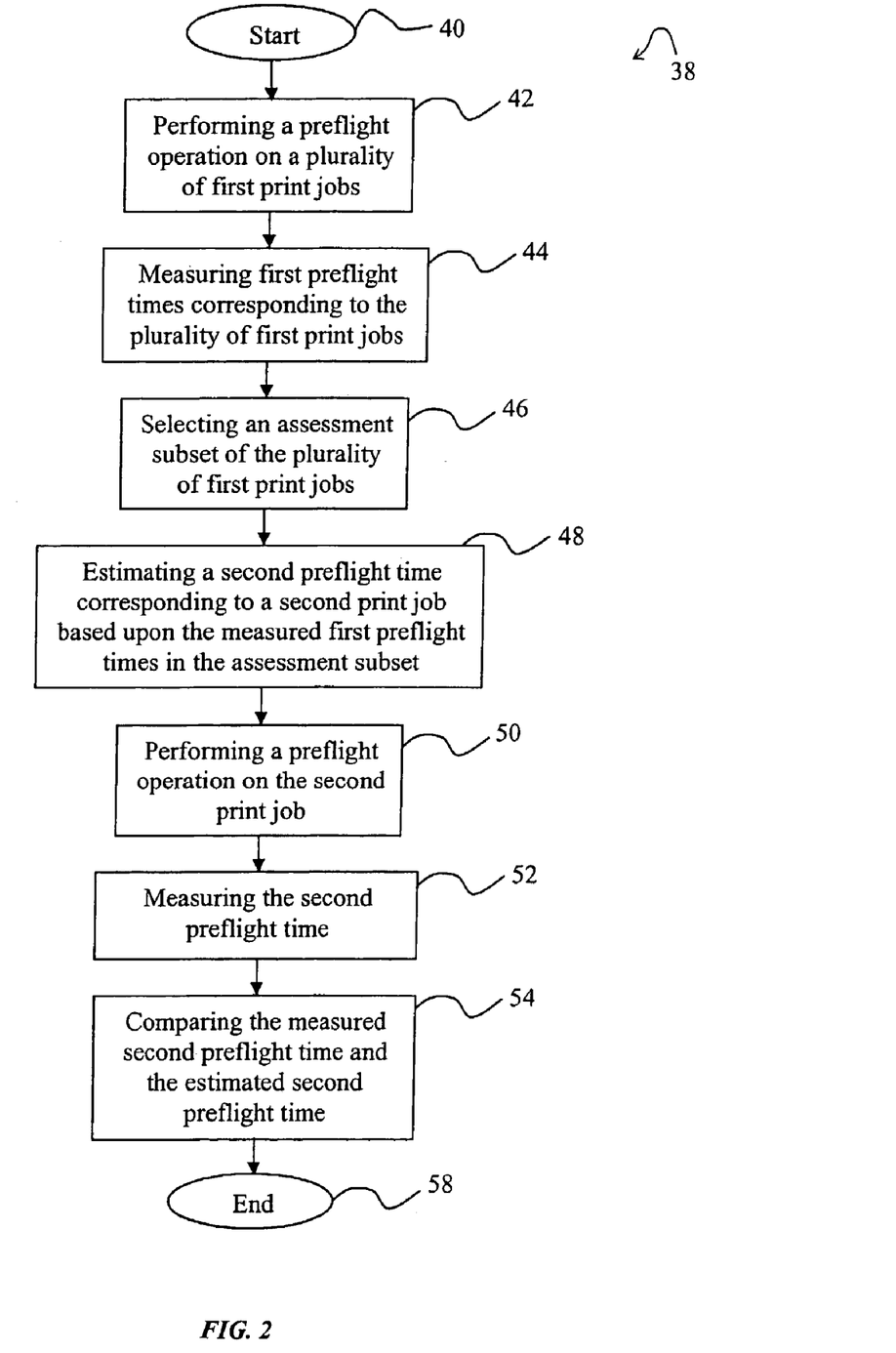
FIG. 2 is a flow diagram of a process for estimating a preflight time according to an embodiment of the present invention.

FIG. 2 is a flow diagram of a process 38, according to one embodiment of the present invention, for estimating the second preflight time 27 corresponding to the second print job 13 shown in FIG. 1. Referring to FIGS. 1 and 2, after start 40, the process 38 comprises performing 42 a preflight 16 operation on the plurality of first print jobs 12, measuring 44 the first preflight times 25 corresponding to the plurality of first print jobs 12, selecting 46 an assessment subset of the plurality of first print jobs 12, and estimating 48 the second preflight time 27 based upon the measured first preflight times 25 in the assessment subset. As described above, performing 42 the preflight 16 operation comprises preparing a document for reproduction on an output device 30, such as a digital printer.

Figure 3:
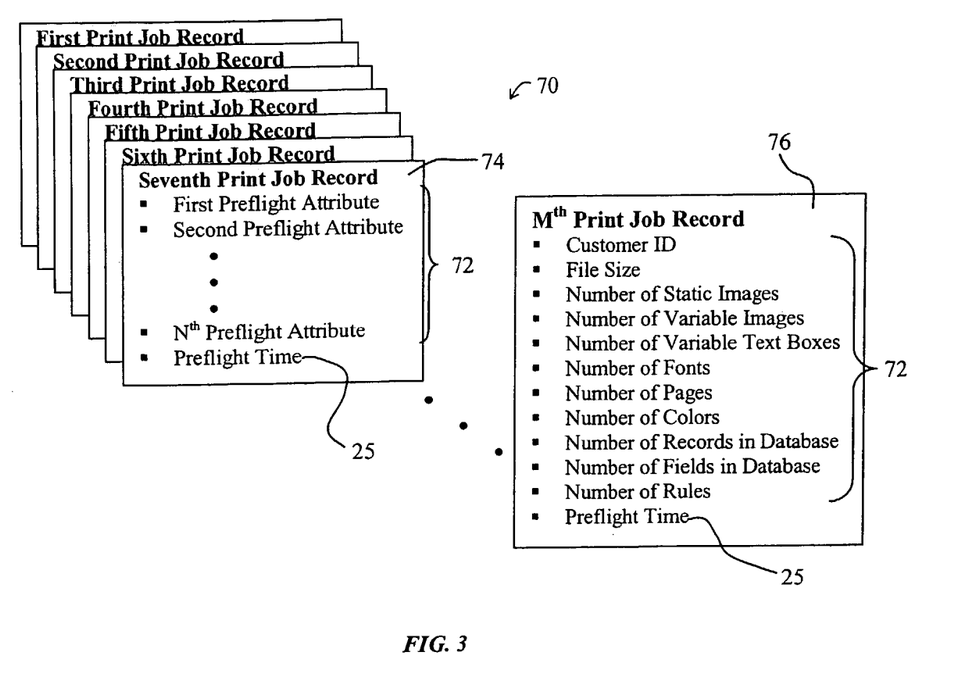
FIG. 3 is a diagram of a plurality of print job records comprising at least one preflight attribute according to an embodiment of the present invention.

Measuring 44 the first preflight times 25 comprises recording the elapsed time required to complete a preflight 16 operation for at least a portion of each of the plurality of first print jobs 12. The preflight times 25 may be recorded in a digital medium (not shown) and may be stored in an information database (not shown). The preflight times 25 may also be recorded with information relative to the plurality of first print jobs 12. FIG. 3 illustrates M number of print job records 70 according to an embodiment of the present invention. Each of the print job records 70 corresponds to one of the plurality of first print jobs 12 shown in FIG. 1. Each of the print job records 70 comprises at least one preflight attribute 72 and a measured first preflight time 25 corresponding to the particular first print job 12. For example, FIG. 3 shows that the seventh print job record 74 of the plurality of print job records 70 has N number of preflight attributes 72 and that the $M^{th}$ print job record 76 has eleven preflight attributes 72.

Figure 4A:
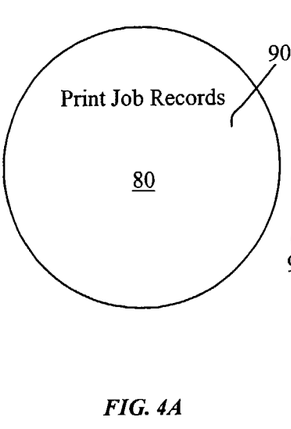
FIG. 4 is a conceptual representation of an assessment subset of print job records according to an embodiment of the present invention.

Referring again to FIGS. 1 and 2, selecting 46 an assessment subset of the plurality of first print jobs 12 comprises identifying at least one of the plurality of first print job 12 having at least one preflight attribute in common with the second print job 13. For example, FIGS. 4A-4C each show a representation of a plurality of print job records 80 included within an assessment subset 90, 92, 94. Each of the plurality of print job records 80 corresponds to one of the plurality of first print jobs 12. In FIG. 4A, the assessment subset 90 comprises every print job record in the plurality of print job records 80. It may be advantageous to select 46 assessment subset 90 when the number of print job records 80 is small enough to reduce the statistical advantage of narrowing the assessment subset 90. It may also be advantageous to select 46 assessment subset 90 when the second print job 13 does not share a significant preflight attribute with less than all of the plurality of first print jobs 12.

Figure 4B:
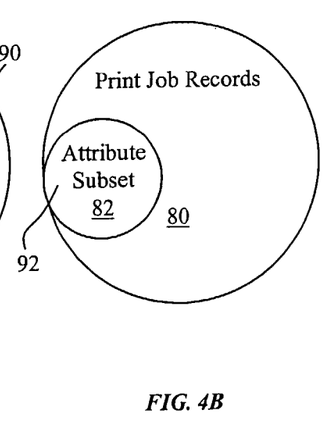

In FIG. 4B, the assessment subset 92 comprises only those print job records of the plurality of print job records 80 having a first preflight attribute 82. For example, the assessment subset 92 may include all print job records having the same customer ID. Thus, all print jobs 12 corresponding to a particular customer may be selected 46 to be tracked and analyzed together. As discussed above, selecting 46 assessment subset 92 corresponding to a particular customer may be advantageous since there may be a disparity in preflight times 25 for the particular customer as compared to other customers.

Figure 4C:
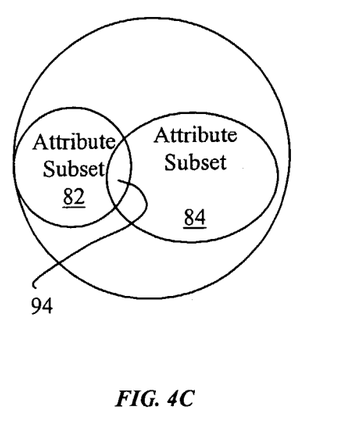

In FIG. 4C, the assessment subset 94 comprises only those print job records of the plurality of print job records 80 having both the first preflight attribute 82 and a second preflight attribute 84. For example, the assessment subset 94 may include all print job records having the same customer ID and which are also personalized printing campaigns. Alternatively, although not shown in FIG. 4C, assessment subset 94 may comprise those print job records of the plurality of print job records 80 having any number of preflight attributes in common.

Referring again to FIGS. 1 and 2, estimating 48 the second preflight time 27 based upon the measured first preflight times 25 in the assessment subset comprises computing a value that lies within a range of the first preflight times 25 in the assessment subset according to a prescribed relationship. For example, the value may be selected by computing the average or mean of the first preflight times 25 within the range. Similarly, the value may be selected by other statistical or sampling methods as are known by those of ordinary skill in the art. One of ordinary skill in the art will recognize that it may be advantageous to increase the accuracy of the analysis 48 by increasing the number of first preflight times 25 included within the range.

Figure 5:
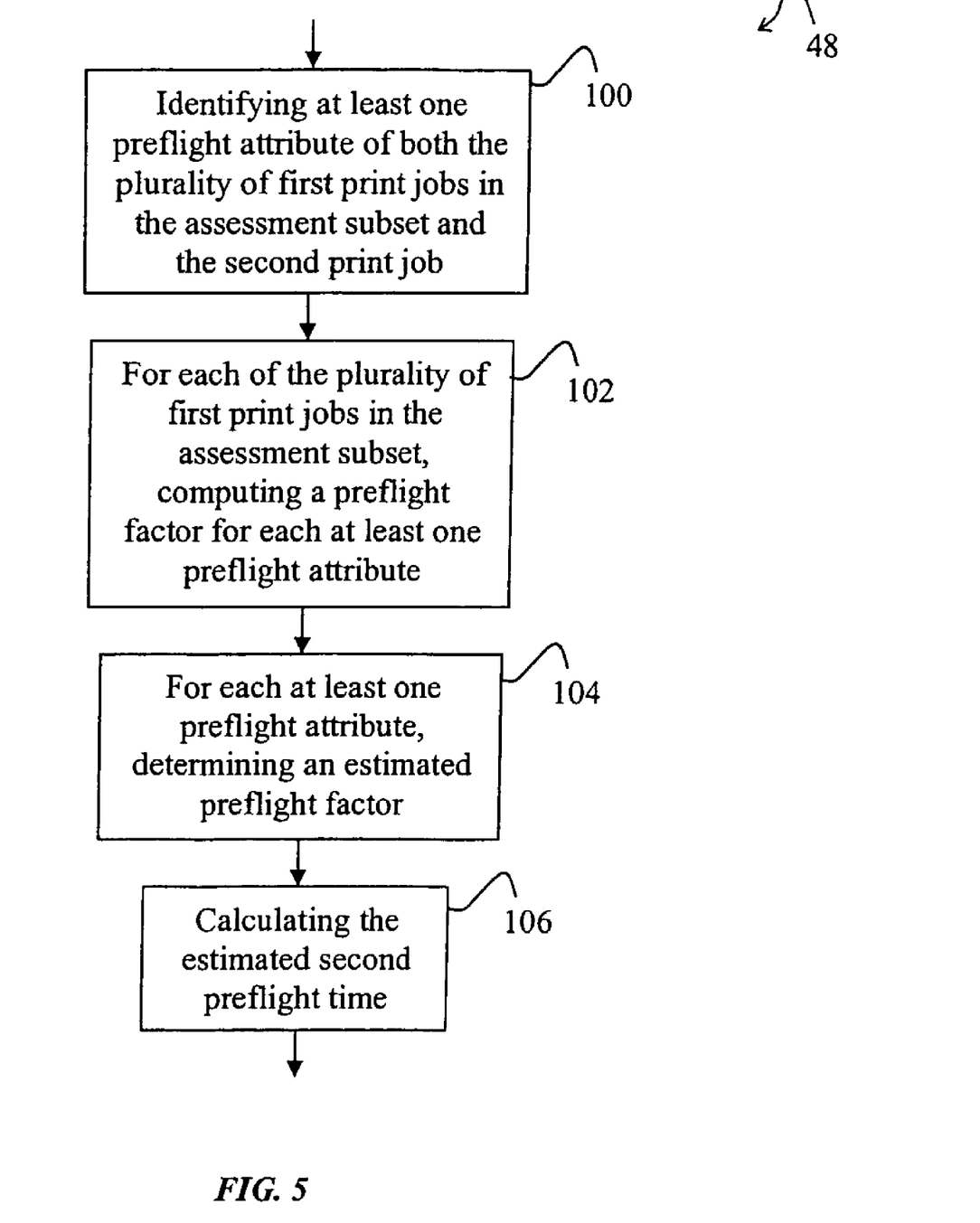
FIG. 5 is a flow diagram of a method for estimating a second preflight time based upon previously measured first preflight times according to an embodiment of the present invention.

FIG. 5 is a flow diagram illustrating the process of estimating 48 the second preflight time 27 shown in FIG. 2 by analyzing the differences between the measured first preflight times 25 in the assessment subset relative to at least one preflight attribute, according to another embodiment of the present invention. As shown in FIG. 5, estimating 48 the second preflight time 27 comprises identifying 100 at least one preflight attribute of both the plurality of first print jobs 12 in the assessment subset and the second print job 13. As discussed above, the at least one preflight attribute is a property or characteristic of the plurality of first print jobs 12 and the second print job 13 that affects the amount of resources 26 required to be used during preflight 16.

Estimating 48 the second preflight time 27 further comprises, for each of the plurality of first print jobs 12 in the assessment subset, computing 102 a preflight factor for each at least one preflight attribute. Each preflight factor is a representation of the influence that the at least one preflight attribute had on the corresponding preflight time. Each preflight factor may be computed according to the equation:

preflight factor=(preflight time)/(preflight attribute value) (1).

Estimating 48 the second preflight time 27 further comprises, for each at least one preflight attribute, determining 104 an estimated preflight factor corresponding to the second print job 13. Each estimated preflight factor may be determined 104 by choosing a value that lies within a range of the computed 102 preflight factors corresponding to the particular at least one preflight attribute according to a prescribed relationship. For example, the value may be selected by determining 104 the average or mean of the computed 102 preflight factors corresponding to the particular at least one preflight attribute. Similarly, the value may be selected by other statistical or sampling methods known in the art.

Estimating 48 the second preflight time 27 further comprises calculating 106 the estimated second preflight time 27. The second preflight time 27 may be calculated 106 according to the following equation:

$$\text{estimated second preflight time} = \frac{1}{k}\sum_{i=1}^{k}(EPF_i)(PA_i) \quad (2)$$

wherein k is the number of at least one preflight attributes;
EPF is the estimated preflight factor corresponding to the $i^{th}$ preflight attribute; and
PA is the $i^{th}$ preflight attribute of the second print job 13.

Referring again to FIGS. 1 and 2, the process 38 further comprises performing 50 a preflight 16 operation on the second print job 13, measuring 52 a second preflight time (not shown) corresponding to the second print job 13, comparing 54 the measured second preflight time and the estimated second preflight time 27, and ending 58. Thus, it may be advantageous to adjust equation (2) above to more accurately estimate 48 the second preflight time 27 based upon the actual measured second preflight time. For example, referring to FIG. 5, it may be determined that changes in a first preflight attribute has a greater effect on the measured preflight time than changes in a second preflight attribute, the first and second preflight attributes being part of the identified 100 at least one preflight attributes. Therefore, it may be advantageous to weight the first preflight attribute greater than the second preflight attribute. Thus, equation (2) above may be expressed as:

$$\text{estimated second preflight time} = \sum_{i=1}^{k}(EPF_i)(PA_i)(W_i) \quad (3)$$

wherein, W is a weight factor corresponding to the $i^{th}$ preflight attribute and $$\sum_{i=1}^{k} W_i = 1 \qquad (4)$$

Figure 6:
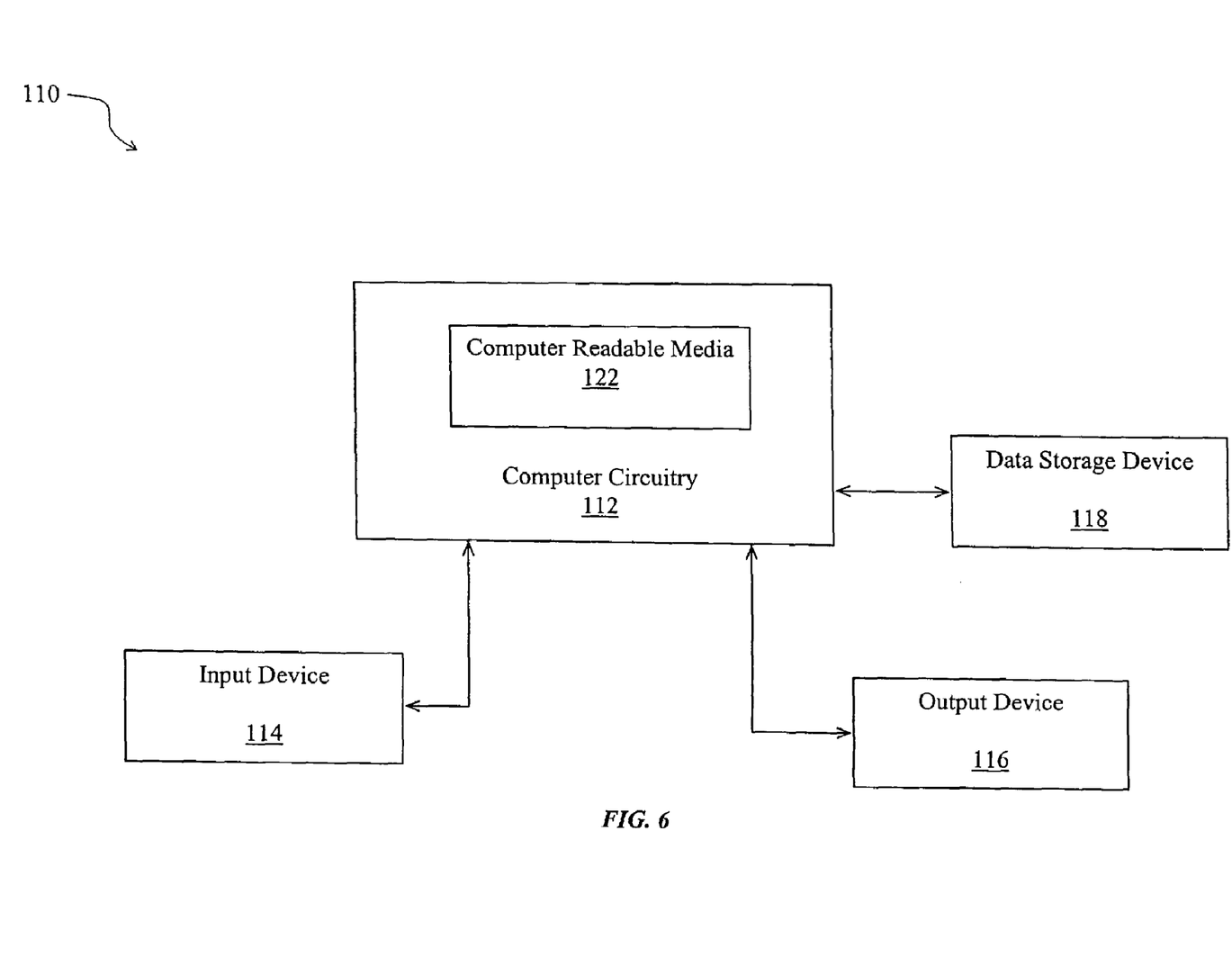
FIG. 6 is a block diagram of a computer system according to an embodiment of the present invention.

FIG. 6 is a block diagram of a computer system 110 employing the process 38 illustrated in FIG. 2 according to an embodiment of the present invention. Although not shown, the computer system may be part of an output device, such as a digital printer. The computer system comprises computer circuitry 112, at least one input device 114, at least one output device 116, and a data storage device 118. Computer circuitry 112 typically performs computer functions such as executing software programs to perform desired calculations and tasks. Computer circuitry 112 comprises computer readable media 122 including computer executable instructions for performing the process 38 illustrated in FIG. 2. Alternatively, the computer readable media 122 may be configured to be accessed by the computer circuitry via the input device 114 or the data storage device 118. By way of example only, and not by limitation, the computer readable media 122 may be selected from a group comprising a hard drive, a floppy disc, a tape cassette, a CD-ROM and a DVD-ROM.

The input device 114 may include, by way of example only, an Internet or other network connection, a mouse, a keypad or any device that allows an operator to enter data into the computer circuitry 112. The output device 116 may include, by way of example only, a printer or a video display device. The data storage device may include, by way of example only, drives that accept hard and floppy discs, tape cassettes, CD-ROM or DVD-ROM.

EXAMPLE

As an example of the process 38 described in FIG. 2 above, TABLE 1 below illustrates seven print job records. For reference, each print job record listed in TABLE 1 has a corresponding print job record ID number. Print job record number 65478 corresponds to a "new" print job having a corresponding measured preflight time in brackets to indicate that the preflight time was not measured until after the preflight time was estimated in a manner described below. The remaining six print job records correspond to "prior" print jobs that each have a corresponding measured preflight time. For purposes of this example, it may be assumed that the seven print job records all correspond to print jobs performed for a single customer of a print shop.

TABLE 1

| Print Job Record ID Number | Measured Preflight Time (min.) | File Size (MB) | File Factor (min./MB) | Number of Images | Image Factor (min./image) |
|---|---|---|---|---|---|
| 65478 (new) | [20] | 20 | [1.00] | 5 | [4.00] |
| 65399 (prior) | 15 | 20 | 0.75 | 4 | 3.75 |
| 65256 (prior) | 60 | 100 | 0.60 | 8 | 7.50 |
| 65254 (prior) | 45 | 85 | 0.53 | 6 | 7.50 |
| 65110 (prior) | 50 | 35 | 1.43 | 8 | 6.25 |
| 65002 (prior) | 15 | 15 | 1.00 | 5 | 3.00 |
| 64874 (prior) | 30 | 20 | 1.50 | 5 | 6.00 |

TABLE 1 also lists two preflight attributes (i.e., file size and number of images) and two preflight factors (i.e., file factor and image factor) for each print job record. As shown in TABLE 1, the file size has been used to compute a corresponding file factor for each print job record according to equation (1) above. Similarly, the number of images has been used to compute a corresponding image factor for each print job record according to equation (1) above. The brackets around the file factor and image factor for print job record number 65478 indicate that these values were not computed until after the actual preflight time was measured.

According to one embodiment of the present invention described above, a preflight time for print job record number 65478 may be estimated by averaging the measure preflight times of the remaining six print job records. Thus, the estimated preflight time for print job record number 65478 is approximately 35.83 minutes. Compared with the subsequent measured time of 20 minutes, this is an error of approximately 15.83 minutes.

According to another embodiment of the present invention described above, a preflight time for print job record number 65478 may be estimated by using equation (2) above and taking into account the number of images in each of the six prior print job records. The image factors of the six prior print job records may be averaged to produce an estimated image factor of approximately 5.67 (min./image). Thus, for print job record number 65478, equation (2) provides:

$$\text{estimated preflight time} = (5.67 \text{ min./image})(5 \text{ images}) = 28.35 \text{ minutes} \qquad (5)$$

which is an error of approximately 8.35 minutes.

According to another embodiment of the present invention described above, a preflight time for print job record number 65478 may be estimated by using equation (2) above and taking into account both the number of images and the file size of each of the six prior print job records. The file factors of the six prior print job records may be averaged to produce an estimated file factor of approximately 0.97 (min./MB). Using the estimated image factor calculated above, equation (2) provides:

$$\text{estimated preflight time} = \tfrac{1}{2}[(5.67 \text{ min./image})(5 \text{ images}) + (0.97 \text{ min./MB})(20 \text{ MB})] = 23.88 \text{ minutes} \qquad (6)$$

which is an error of approximately 3.88 minutes.

According to another embodiment of the present invention described above, the accuracy of the estimated preflight time computed in equation (6) above may be increased by weighting the preflight attributes. For example, it may be determined that for the particular type of print jobs being considered in TABLE 1 that the file size has an effect upon the corresponding preflight time which is 90% greater than that of the number of images. Thus, equation (3) above may be used to estimate the preflight time for print job record number 65478 wherein the weight factor for the file size is 0.9 and the weight factor for the number of images is 0.1. Therefore, equation (3) provides:

estimated preflight time=(5.67 min./image)(5 images) (0.1)+(0.97 min./MB)(20 MB)(0.9)=20.29 minutes (7)

which is an error of approximately 0.29 minutes, or approximately 18 seconds.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A method of estimating the preflight time of a printing workflow, the method comprising:
   performing a preflight operation on a plurality of first print jobs;
   measuring a first preflight time for each of the plurality of first print jobs;
   after the measuring, receiving a second print job;
   selecting an assessment subset of print jobs from the plurality of first print jobs based on the second print job;
   estimating a second preflight time corresponding to the second print job based upon the measured first preflight times in the assessment subset; and
   communicating to a customer the second preflight time or information derived at least in part from the second preflight time.

2. The method of claim 1, wherein measuring a first preflight time further comprises storing each of the first preflight times in a corresponding different print job record, wherein the print job record includes a recorded preflight attribute.

3. The method of claim 1, wherein selecting the assessment subset comprises identifying at least one of the plurality of first print jobs having at least one preflight attribute in common with the second print job.

4. The method of claim 1, wherein estimating the second preflight time comprises computing a value that lies within a range of the measured first preflight times in the assessment subset according to a prescribed relationship.

5. The method of claim 1, wherein estimating the second preflight time comprises analyzing the differences between the measured first preflight times in the assessment subset relative to at least one preflight attribute.

6. The method of claim 5, wherein analyzing the differences comprises:
   identifying the at least one preflight attribute, wherein the at least one preflight attribute is common to both the plurality of first print jobs in the assessment subset and the second print job;
   computing a preflight factor for each at least one preflight attribute for each of the plurality of first print jobs in the assessment subset;
   determining an estimated preflight factor; and
   calculating the estimated second preflight time for each at least one preflight attribute.

7. The method of claim 6, wherein computing the preflight factor comprises determining a ratio of the corresponding measured first preflight time and the corresponding at least one preflight attribute.

8. The method of claim 6, wherein determining the estimated preflight factor comprises choosing a value that lies within a range of the computed preflight factors according to a prescribed relationship.

9. The method of claim 5, further comprising weighting each at least one preflight attribute.

10. The method of claim 1, further comprising:
    performing a preflight operation on the second print job;
    measuring the second preflight time; and
    comparing the measured second preflight time and the estimated second preflight time.

11. A printer configured to estimate preflight times in a printing workflow, the printer comprising:
    a data storage device configured to store a plurality of first preflight times of a corresponding plurality of first print jobs; and
    computer circuitry configured to receive a second print job and estimate a second preflight time of the second print job based upon the first preflight times of an assessment subset of the plurality of first print jobs, the assessment subset based on the second print job,
    wherein the printer is configured to schedule the second print job for printing based at least in part upon the second preflight time.

12. The printer of claim 11, further comprising:
    an input device; and
    an output device.

13. The printer of claim 11, wherein the computer circuitry is further configured to estimate the second preflight time by computing a value that lies within a range of the first preflight times of the assessment subset according to a prescribed relationship.

14. The printer of claim 11, wherein the computer circuitry is further configured to estimate the second preflight time by analyzing the differences between the first preflight times of the assessment subset relative to at least one preflight attribute.

15. The printer of claim 14, wherein the computer circuitry is further configured to compute, for each of the first preflight times of the assessment subset, a preflight factor for each at least one preflight attribute and, for each at least one preflight attribute to determine an estimated preflight factor.

16. The printer of claim 15, wherein the computer circuitry is further configured to compute each preflight factor by determining a ratio of the corresponding first preflight times of the assessment subset and the corresponding at least one preflight attribute.

17. The printer of claim 15, wherein the computer circuitry is further configured to determine the estimated preflight factor by choosing a value that lies within a range of the computed preflight factors according to a prescribed relationship.

18. The printer of claim 14, further comprising weighting each at least one preflight attribute.

19. The printer of claim 11, wherein the computer circuitry is further configured to receive a measured second preflight time; and compare the measured second preflight time and the estimated second preflight time.

20. Computer readable media including computer executable instructions for performing:
    determining a plurality of first preflight times each corresponding to a preflight operation of one of a plurality of corresponding first print jobs;
    after the determining, receiving a second print job;
    selecting a subset of the plurality of first preflight times based on the second print job;

estimating a second preflight time based upon the of first preflight times in the subset; and communicating to a customer the second preflight time or information derived at least in part from the second preflight time.

21. The computer readable media of claim 20, wherein estimating the second preflight time comprises computing a value that lies within a range of the first preflight times in the subset according to a prescribed relationship.

22. The computer readable media of claim 20, wherein estimating the second preflight time comprises analyzing the differences between the plurality of first preflight times in the subset relative to at least one preflight attribute.

23. The computer readable media of claim 22, wherein analyzing the differences comprises:

for each of the first preflight times in the subset, computing a preflight factor for each at least one preflight attribute;

for each at least one preflight attribute, determining an estimated preflight factor; and calculating the estimated second preflight time.

24. The computer readable media of claim 23, wherein computing the preflight factor comprises determining a ratio of the corresponding first preflight times in the subset and the corresponding at least one preflight attribute.

25. The computer readable media of claim 23, wherein determining the estimated preflight factor comprises choosing a value that lies within a range of the computed preflight factors according to a prescribed relationship.

26. The computer readable media of claim 22, further comprising weighting each at least one preflight attribute.

27. The computer readable media of claim 20, further comprising:

receiving a measured second preflight time; and comparing the measured second preflight time and the estimated second preflight time.

28. A method of estimating the preflight time of a printing workflow, the method comprising:

performing a preflight operation on a plurality of first print jobs;

measuring a first preflight time for each of the plurality of first print jobs;

after the measuring, receiving a second print job;

selecting an assessment subset of print jobs from the plurality of first print jobs based on the second print job;

estimating a second preflight time corresponding to the second print job based upon the measured first preflight times in the assessment subset; and scheduling the second print job for printing based at least in part upon the second preflight time.

* * * * *

UNITED STATES PATENT AND TRADEMARK OFFICE
CERTIFICATE OF CORRECTION

PATENT NO. : 7,345,781 B2
APPLICATION NO. : 10/400785
DATED : March 18, 2008
INVENTOR(S) : Orhan E. Beckman et al.

It is certified that error appears in the above-identified patent and that said Letters Patent is hereby corrected as shown below:

In column 10, line 43, in Claim 15, after "attribute" insert -- , --.

In column 11, line 1, in Claim 20, after "upon the" delete "of".

Signed and Sealed this

Eleventh Day of August, 2009

David J. Kappos
*Director of the United States Patent and Trademark Office*